United States Patent [19]
Giannuzzi et al.

[11] Patent Number: 5,806,275
[45] Date of Patent: Sep. 15, 1998

[54] CHEMICAL ANCHOR BOLT AND CAP ASSEMBLY

[76] Inventors: Anthony C. Giannuzzi; Louis N. Giannuzzi, both of 28 Doral Farm Rd., Stamford, Conn. 06902

[21] Appl. No.: 720,921

[22] Filed: Oct. 7, 1996

[51] Int. Cl.[6] ........................................................ E04B 1/38
[52] U.S. Cl. ............................ 52/704; 52/705; 405/259.5
[58] Field of Search ............................ 52/698, 704, 705; 411/85, 301, 429, 914; 405/259.5, 259.6

[56] References Cited

U.S. PATENT DOCUMENTS

| | | | |
|---|---|---|---|
| 3,418,781 | 12/1968 | Penote | 52/704 |
| 4,055,929 | 11/1977 | Stancati et al. | 52/705 |
| 4,149,350 | 4/1979 | Fischer et al. | 52/704 |
| 4,642,964 | 2/1987 | Kellison | 52/699 |
| 4,840,524 | 6/1989 | Bisping et al. | 52/704 X |
| 5,490,365 | 2/1996 | Roth | 52/704 |

*Primary Examiner*—Christopher Kent
*Attorney, Agent, or Firm*—Michael Ebert

[57] ABSTRACT

A chemical anchor bolt and cap assembly installable in a hole drilled in masonry to tightly fasten a fixture thereto and to resist loosening of the fastening should the masonry be subjected to vibratory or other external forces. The assembly includes a bolt having an externally-threaded cylindrical shank coated with a release agent and a thin-walled hollow cap having a non-cylindrical shape coupled to the end of the shank and extending therefrom in axial alignment with the shank. To install the assembly, the shank and the cap coupled thereto are inserted through a mounting hole in the fixture into the masonry hole in which is deposited an uncured epoxy that then surrounds the cap and the shank. When the epoxy hardens, formed therein is a female thread matching the release-coated male thread of the shank so that the bolt is now turnable, the cap being then embedded in the epoxy. As a consequence, formed in the masonry hole below the end of the shank is a hard epoxy column having a non-cylindrical cavity whose epoxy bank is defined and lined by the non-cylindrical cap to create a partial barrier to the unimpeded advance of the shank. To tighten the fastening, the bolt is turned to advance the end of the shank into the cavity, the shank then overcoming the partial barrier by cutting into and tapping the lined epoxy bank. The resultant frictional engagement between the end of the shank and the partial barrier acts to resist loosening of the fastening.

14 Claims, 3 Drawing Sheets

CHEMICAL ANCHOR BOLT AND CAP ASSEMBLY

BACKGROUND OF INVENTION

1. Field of Invention

This invention relates generally to chemical anchors installable in a hole drilled in masonry in which is deposited a chemical bonding agent to fasten a fixture or other object to the surface of the masonry, and more particularly to a chemical anchor bolt and cap assembly which makes it possible to tighten the fastening and in doing so to render the anchor resistant to vibratory and other external forces to which the masonry is subjected seeking to loosen the fastening.

2. Status of Prior Art

The term masonry refers to a construction of stone or similar material such as concrete and brick. The walls, ceiling and floors of many edifices are formed of masonry. In order, therefore, to fasten fixtures, machines, structural members or other objects to masonry, a masonry anchor is required for this purpose.

In the case of concrete or any other form of masonry, one cannot drill a hole therein and then tap this hole so that it can receive an anchor bolt, a threaded stud or other threaded mounting means to secure a fixture or other object to the face of the masonry. The nature of masonry is such that a cutting action to cut deep female threading into the bank of the hole cannot be effected, for this action will disintegrate the masonry material.

In order, therefore, to anchor a threaded rod or stud in a hole drilled in masonry, the present practice is to use a curable chemical bonding agent for this purpose. The typical agent of this type has two flowable components, one being a resinous bonding agent, the other a hardener therefor. The resins may be phenol, vinyl, ester or epoxy based. The two components, when stored, must be separated to prevent interaction therebetween. Many bonding agents currently available have an accelerated curing time and set within 10 to 30 minutes to afford substantial holding power. In practice, a charge of the resinous component and sufficient hardener intermixed therewith are deposited in the hole, and a threaded mounting stud is then inserted in the hole.

To this end use may be made of a dispenser gun to inject a charge of the flowable bonding agent into the drilled hole. Or the charge may be contained in a capsule that is deposited in the drilled hole and is ruptured to release the bonding agent when the stud is inserted in the hole.

After the resinous interfacial layer between the stud and the bank of the hole cures and rigidities, it then bonds itself both to the stud and to the masonry whereby the stud is permanently anchored in the hole. In order now to secure a fixture to the masonry face, the fixture which has a mounting hole therein is placed over and onto the projecting stud and locked thereto by a washer and nut.

A chemical anchor in accordance with the invention is useable with any type of curable bonding agent capable of setting in a reasonable time. The term epoxy, as hereafter used, is intended to cover a two-component epoxy and any other suitable curable bonding agent.

The concern of the present invention is with a chemical anchor that makes use of a bolt from whose head extends an externally-threaded cylindrical shank coated with a release agent such as Teflon (tetrafluoroethylene TFE) or a similar material having non-stick properties. When the shank of the bolt is inserted in a drilled masonry hole having a charge of an uncured bonding agent deposited therein, the release coating prevents this agent, when cured and hardened, from adhering to the shank.

A chemical anchor of this known type is disclosed in the Kellison U.S. Pat. No. 4,642,964 and also in the Roth U.S. Pat. No. 5,590,360. In the chemical anchors disclosed in these patents, when the bonding agent hardens in the drilled masonry hole, a female thread is then impressed in the hardened epoxy surrounding the shank. This female thread matches the male thread of the release-coated shank; hence the bolt is then free to turn in the female thread in either direction.

In order to be able to tighten the fastening of the fixture against the masonry, a torque tool is used to engage the head of the bolt which lies over the surface of the fixture and to turn the bolt to threadably advance the shank which is received in the masonry hole.

To make this advance possible, Kellison attaches a cap to the end of the shank while Roth attaches a cylindrical housing to the end of the shank. In both cases this creates in the hardened epoxy below the end of the shank in the drilled masonry hole a void to accommodate the advancing shank. As the shank advances into the void, the head of the bolt then presses harder against the surface of the fixture to tighten the fastening.

The drawback to the prior Kellison and Roth void-producing chemical anchors is that the masonry in which it is installed may be subjected to vibratory, shock and other external forces which seek to loosen the fastening. The void, by its very nature, offers no resistance to this action. The threaded shank of the bolt is turnable in either direction in the female thread in the epoxy surrounding the shank, and the end of the shank when the installation is tightened lies within the void. Hence when the bolt is thereafter subjected to external forces which seek to turn the threaded shank out of the drilled masonry hole, the bolt is then free to turn out and thereby loosen the installation.

SUMMARY OF INVENTION

In view of the foregoing, the main object of this invention is to provide a chemical anchor bolt and cap assembly adapted to be installed in a hole drilled in masonry containing a charge of curable epoxy to tightly fasten a fixture or other object having a mounting hole to the masonry and to resist loosening of the fastening should the masonry be subjected to external forces seeking to do so.

More particularly, an object of this invention is to provide an assembly of the above-noted type that includes a bolt having a release-coated, threaded cylindrical shank extending from a head and a non-cylindrical cap coupled to the end of the cylindrical shank and extending therefrom in axial alignment with the shank, the cap serving when the assembly is installed in a hole drilled in masonry not only to facilitate tightening of the fastening but also to resist loosening thereof.

A significant feature of an assembly in accordance with the invention is that the dimensions of the bolt shank and of the non-cylindrical cap coupled to the end of the shank are such that the cap and shank are insertable through a mounting hole in the fixture into the drilled masonry hole whose diameter is such as to create in the drilled hole an annular space surrounding the cap and the shank which is fillable by an uncured epoxy whereby when the epoxy cures and hardens, formed therein is a female thread matching the release-coated thread of the shank, the cap then being embedded in the epoxy, Also an object of this invention is to provide an assembly of the above type which has mounted on the shank below the head of the bolt a deformable collar whereby when the assembly is installed in a hole drilled in masonry to fasten a fixture thereto, and the bolt is then turned to tighten the fastening, the collar is deformed by this action to permit the shank to advance.

Briefly stated, these objects are attained by a chemical anchor bolt and cap assembly installable in a hole drilled in masonry to tightly fasten a fixture thereto and to resist loosening of the fastening should the masonry later be subjected to vibratory or other external forces. The assembly includes a bolt having an externally-threaded cylindrical shank coated with a release agent and a thin-walled hollow cap having a non cylindrical shape coupled to the end of the shank and extending therefrom in axial alignment with the shank. To install the assembly, the shank and the cap coupled thereto are inserted through a mounting hole in the fixture into the masonry hole in which is deposited an uncured epoxy that then surrounds the cap and the shank. When the epoxy hardens, formed therein is a female thread matching the release-coated thread of the shank so that the bolt is now turnable, the cap being then embedded in the epoxy. As a consequence, formed in the masonry hole below the end of the shank is a hard epoxy column having a non-cylindrical cavity whose epoxy bank is defined and lined by the non-cylindrical cap to create a partial barrier to the unimpeded advance of the shank. To tighten the fastening, the bolt is turned to advance the end of the shank into the cavity, the shank then overcoming the partial barrier by cutting into and tapping the lined epoxy bank. The resultant frictional engagement between the end of the shank and the partial barrier acts to resist loosening of the fastening.

BRIEF DESCRIPTION OF DRAWING

For a better understanding of the invention as well as other objects and further features thereof, reference is made to the following detailed description to be read in conjunction with the accompanying drawing, wherein.

DETAILED DESCRIPTION OF INVENTION

First Embodiment

Figure 1:
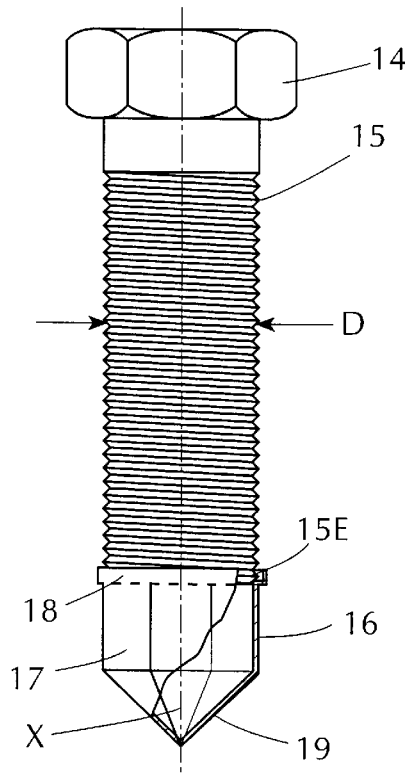
FIG. 1 is an elevational view of one embodiment of a chemical anchor and cap assembly in accordance with the invention.
Figure 4:
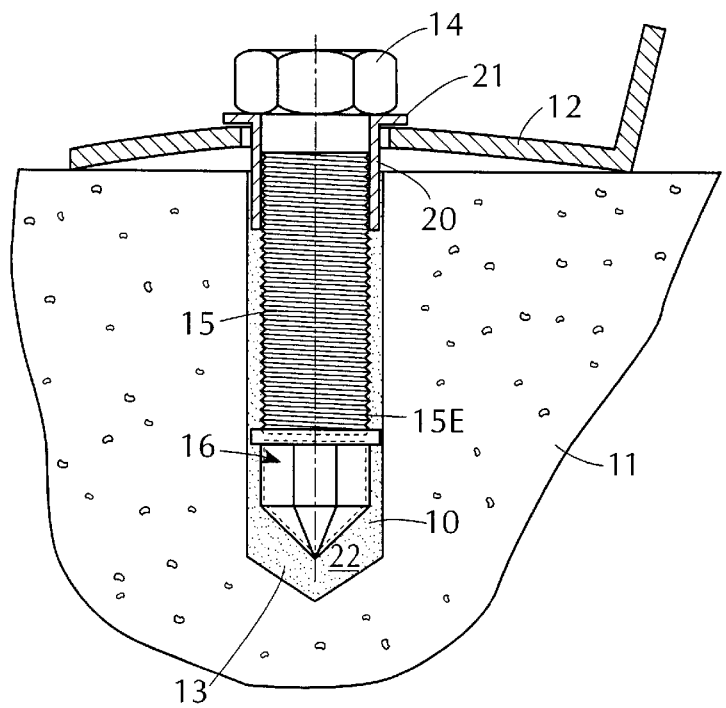
FIG. 4 is a sectional view of the assembly installed in a hole drilled in masonry and held chemically therein by an epoxy to fasten a fixture to the masonry, the assembly being shown in its condition prior to tightening.

FIGS. 1 and 4 illustrate one preferred embodiment of a chemical anchor bolt and cap assembly in accordance with the invention, FIG. 4 showing the assembly installed in a hole 10 drilled in masonry 11, such as a concrete wall, to fasten a fixture 12 or another object having a mounting hole against the surface of the wall.

Deposited in drilled masonry hole 10 is a charge of a curable bonding agent 13, such as a two-component epoxy, one component of which is a resin and the other a hardener therefor. Bonding agent 13, when cured and hardened, serves to chemically bond the assembly to the masonry. In practice use may be made of any other suitable masonry bonding agent.

The assembly includes a bolt fabricated of steel or other high-strength corrosion-resistant material, the bolt having an enlarged hexagonal head 14 engageable by a wrench or other torque tool. Extending from head 14 is an elongated cylindrical shank 15. Shank 15 which is externally threaded along its length to define a male thread, has a predetermined diameter D. The threaded surface of shank 15 is coated with a release agent, such as a film of PTFE or other non-stick material whose nature is such that the epoxy or other bonding agent in the drilled masonry hole does not adhere thereto.

Threadably or otherwise coupled to extremity 15E of cylindrical bolt shank 15 and extending therefrom is a thin-walled cap 16 having a non-cylindrical shape. The cap may be fabricated of metal, such as aluminum or molded or otherwise formed of relatively stiff synthetic plastic material, such as PVC, polyethylene, polypropylene or other suitable material. When the assembly is inserted through a mounting hole in the fixture to be fastened into a drilled masonry hole in which is deposited a charge of uncured epoxy, the uncured epoxy then flows to surround the shank and the cap coupled to its end. And when the epoxy hardens in the masonry hole, formed therein is a female thread matching the release-coated male thread of the shank so that the bolt is now turnable relative to the cap which is embedded in the epoxy.

The shape and dimensions of the non-cylindrical cap 15 are such as to create in the drilled masonry hole below the end of the shank when the epoxy hardens, a hard epoxy column having a non-cylindrical cavity whose epoxy bank is defined by and lined with the non-cylindrical cap to create a partial barrier to the unimpeded advance of the shank.

To tighten the fastener, the bolt head is engaged by a torque tool and the bolt is turned to advance the end of the shank into the non-cylindrical cavity, the shank overcoming the partial barrier by cutting into the lined epoxy bank of the cavity. The resultant frictional engagement between the end of the shank and the partial barrier acts to resist loosening of the bolt should the masonry later be subjected to vibratory and other external forces seeking to turn the bolt out of the masonry hole.

Cap 16 shown in FIGS. 1 and 4 is defined by an octagonal side wall section 17 in axial alignment with the longitudinal axis of the shank, a coupling ring section 18 integral with the upper end of side wall section 17 and a generally conical end wall section 19 integral with the lower end of side wall section 17.

Coupling ring section 18, has an inner diameter matching diameter D of cylindrical shank 15 so that this ring section can be screwed or otherwise coupled to the end of the shank. End wall section 19 is generally conical, being constituted by eight converging triangular sides whose apexes come to a common point on the longitudinal axis X of the cap.

Figure 2:
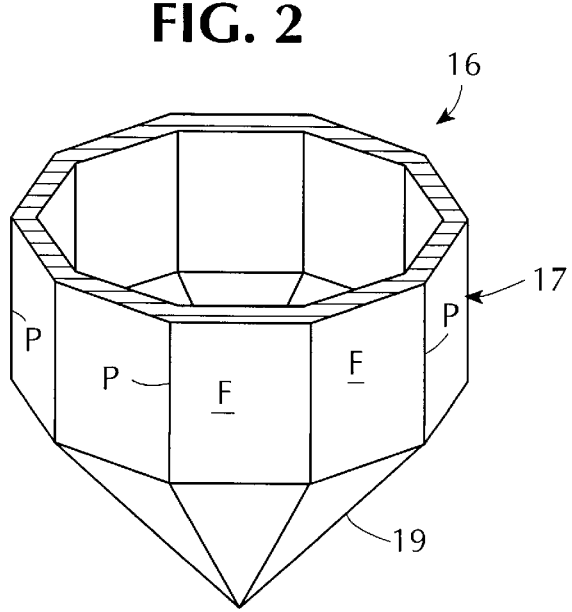
FIG. 2 is a separate perspective view of the octagonal-shaped cap.
Figure 6:
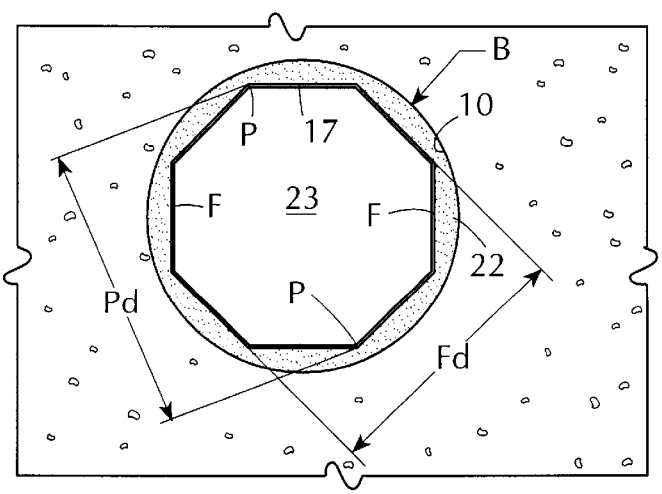
FIG. 6 is a transverse section taken through an epoxy column at the bottom of the drilled hole, the column having an octagonal cavity therein whose bank is lined by the cap.

As shown separately in FIGS. 2 and 6, octagonal sidewall section 17 is defined by eight angled flat facets F and eight triangular peaks P at the respective junctions of the facets.

The dimensions of octagonal sidewall section 16 relative to the predetermined diameter D of the threaded cylindrical shank 15 are such that:

(a) the internal distance Pd between any pair of opposing peaks P of the octagon is equal to diameter D of the shank; and (b) the internal distance Fd between any pair of opposing facets F of the octagon is shorter than diameter D.

Hence if one draws a circle about octagonal cap 16 having the same diameter as diameter D of the cylindrical shank, this circle will encircle all of the peaks P of the cap. Facets F of the cap, like chords subtending arcs, will then divide this circle into eight segments. These segments are filled by hard epoxy when the assembly is installed in a drilled masonry hole.

Figure 3:
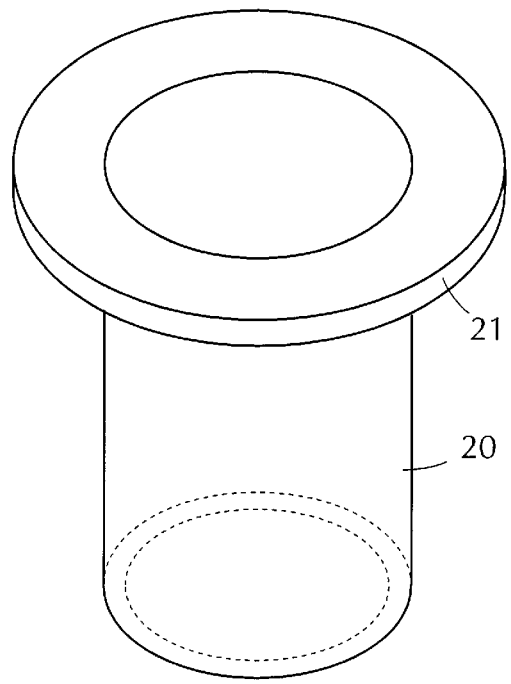
FIG. 3 is a perspective view of the deformable collar included in the assembly.

As separately illustrated in FIG. 3, the assembly also includes a deformable collar 20 having a circular flange 21 at its upper end. Collar 20, as shown in FIG. 4, is mounted on shank 15 below head 14 of the bolt. When the assembly is installed in drilled masonry hole 10, flange 21 then underlies head 14 of the bolt and collar 20 is then telescoped through the mounting hole in fixture 12 into the upper end of the drilled hole. Shank 14 and cap 16 coupled to its end are then immersed in the flowable charge of uncured epoxy 13 which rises in the hole to the level of deformable collar 20 to surround shank 15 and cap 16. Collar 20 prevents epoxy from entering the interface of the masonry and the fixture placed on its surface.

When the epoxy cures and hardens, then in the region in masonry hole 10 surrounding the release-coated shank 15 is a hard epoxy having impressed therein a female thread matching the male thread of the shank. Because of the release coating, the shank is not bonded to the epoxy, but is turnable in either direction in the female thread.

Figure 5:
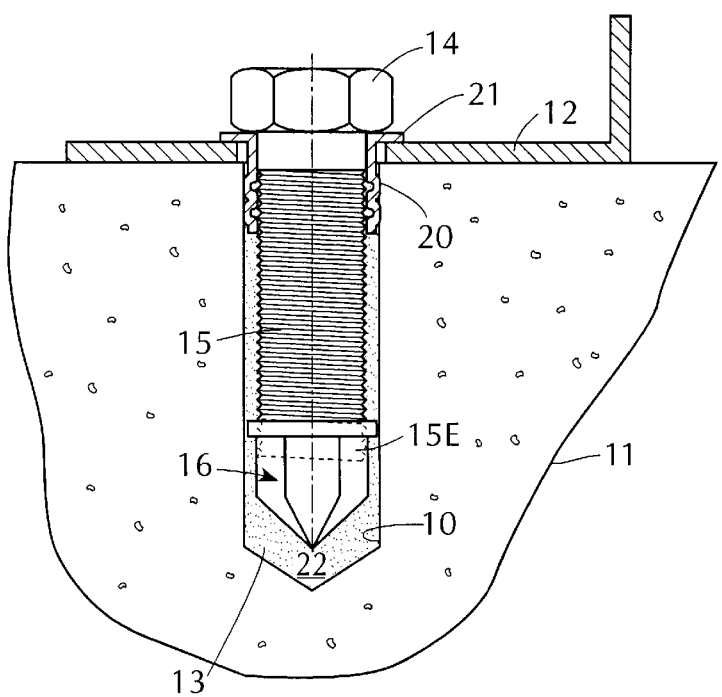
FIG. 5 is a sectional view of the installed assembly which is the same as that shown in FIG. 4 but after it has been tightened.

However, cap 16 is then embedded in the rigid epoxy in drilled hole 10 and is bonded thereto in the region below the end 15E of bolt shank 15. Hence as shown in FIGS. 4, 5 and 6, formed below end 15E of the shank is a column 22 of rigid epoxy having an octagonal cavity 23 therein whose octagonal bank is determined by and lined with the octagonal cap.

Since the internal distance Fd between any pair of opposing facets F of the cap is shorter than the diameter D of the shank 15, and the axis X of the cap is in line with the axis of the shank, the epoxy in the bottom of the drilled hole fills the eight segments behind the facets below the end of the shank to create in each segment a partial barrier B to impede the advance of the shank end into the cap.

When the assembly is installed in the drilled masonry hole, the head of the bolt lies over the surface of fixture 12, as shown in FIG. 4. And while flange 21 of the deformable collar is then interposed between this surface and the underside of the head, the fastening is not tight.

When the assembly is installed in the drilled masonry hole, head 14 of the bolt then lies over the surface of the fixture 12, as shown in FIG. 4. But the fastening is loose, for the head of the bolt does not then press the underside of the fixture into direct contact with the surface on the masonry. This lack of a tight fastening is figuratively represented in FIG. 4 which shows fixture 12 as being bowed and therefore not in contact with the surface of the masonry surrounding the hole drilled therein to receive the assembly.

A typical masonry surface is not perfectly level, nor is a fixture such as one fabricated of wood perfectly level, hence when a fixture overlies a hole drilled in masonry, the undersurface of the fixture is not in direct contact with the surface of the masonry. In order therefore to effect a tight fastening, the head of the bolt whose shank goes through the mounting hole in the fixture must be made to apply pressure to the fixture to bring it into direct contact with the masonry.

The deformable collar 20 is preferably made of nylon so that when subjected to a compressive force, it is then deformed and thereby somewhat shortened in length. Deformable collar 20 is interposed between the head 14 of the bolt and the rigid epoxy in the drilled masonry hole. Hence when the bolt is turned to press its head against the fixture to tighten the fastening, the collar will then yield to permit this action, as shown in FIG. 5.

Figure 7:
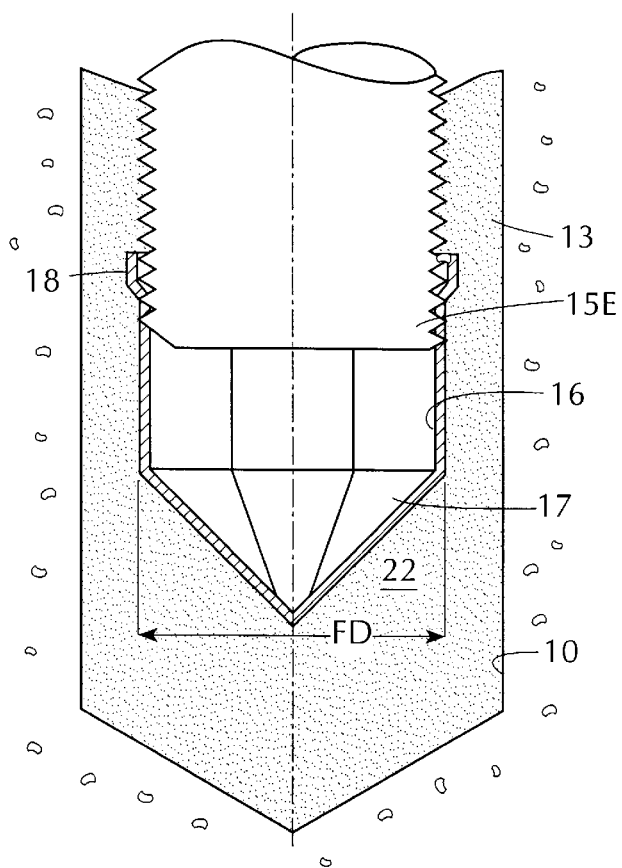
FIG. 7 illustrates the end of the shank of the bolt when it has advanced into the lined octagonal bank of the cavity and is frictionally held therein.

But the multi-segment partial barrier B created by the lined banking the cavity in the epoxy column below the end of the bolt shank must be overcome to permit advance of the shank into the cavity to effect tightening of the fastening. As the end of the shank is turned to advance into cavity 23, it cuts its way in the lined bank of cavity 23 in epoxy column 22 to tap the bank, and thereby overcomes the partial barrier, whereby end 15E of the shank then enters the cavity, as shown in FIGS. 5 and 7.

And since the end 15E of the shank is then in frictional engagement with the partial barrier, this renders the installation resistant to vibratory and other external forces to which the masonry is subjected which seek to loosen the fastening by turning out the bolt.

Though the shape and dimensions of the octagonal cap 16 are such that the internal distance between opposing sides of the shell in one portion thereof (the peaks) is equal to the shank diameter and in another portion (the facets) the Ad distance is shorter to create in the epoxy a partial barrier to the advance of the shank, the same result is obtainable with other polygonal cap shapes.

Other Non-Cylindrical Car Embodiments

The function of the non-cylindrical cap in an assembly in accordance with the invention in which the cap is coupled to the end of the bolt shank is to form when the assembly is inserted in the drilled masonry hole and the epoxy therein hardens to embed the cap, an epoxy column below the end of the shank having a non-cylindrical cavity therein. The lined epoxy bank of this cavity creates a partial barrier to the unimpeded advance of the shank when the bolt is turned to tighten the fastening.

It is important that the distinctions which exist between a void which permits the unimpeded advance of the bolt shank and a partial barrier which resists this advance be clearly understood. To this end we shall first consider an assembly of the type disclosed in the above-identified Roth patent in which coupled to the end of the cylindrical shank is a cylindrical housing or cap whose internal diameter matches the diameter of the shank.

In this prior assembly, when the cylindrical housing or cap is embedded in the hard epoxy in the drilled masonry hole, then formed below the end of the shank is an epoxy column having a cylindrical cavity or void therein in alignment with the shank which offers no resistance to the unimpeded advance of the shank when the bolt is turned in to tighten the fastening.

The practical drawback to this prior arrangement is that the shank of the bolt, when turned in to advance into the cylindrical void and thereby tighten the fastening, remains free to turn out, for the epoxy bank of the void offers no resistance whatever to the withdrawal of the shank from the void. Hence when the masonry installation is subjected to vibratory of shock forces which seek to turn out the shank and loosen the fastening, there is nothing to prevent the shank from turning out, for the shank is free to turn in either direction in the female threading formed in the epoxy.

A non-cylindrical cap in an assembly in accordance with the invention, when embedded in the hard epoxy in the drilled masonry hole, then forms below the end of the shank an epoxy column having a non-cylindrical cavity therein in alignment with the shank. The shape of the cap is such that the epoxy bank of this cavity defined by the cap has at least one portion that projects inwardly into a circle whose diameter matches the diameter of the cylindrical shank.

It is this inwardly projecting portion of the epoxy bank that is intercepted by the advancing end of the cylindrical shank when the bolt is turned in to tighten the fastening. But the projecting portion of the epoxy bank does not block the advance of the shank to form a complete barrier, but acts to resist the advance to form a partial barrier. Thus when the bolt is turned in to tighten the fastening, the shank then overcomes the partial barrier by cutting into and tapping the inwardly projecting portion of the epoxy bank lined by the thin-walled, non-cylindrical cap. The thin-walled cap is relatively weak and easily penetrated by the thread of the shank.

The partial barrier resists, but does not prevent the advance of the end of the shank into the cavity in the epoxy column. This not only makes it possible to tighten the fastening, but it also brings about a frictional engagement of the shank end with the partial barrier which strongly resists loosening of the fastening even when the masonry is subjected to heavy vibratory forces.

An assembly that includes a non-cylindrical cap in accordance with the invention is not limited to a non-cylindrical cap having a hexagonal or polygon shape, as previously disclosed, for other non-cylindrical shapes are useable to create the partial barrier essential to the invention.

Thus the cap may have an oval shape, the long axis of which matches the diameter of the shank and the short axis of which at right angle to the long axis, is somewhat shorter than this diameter. Hence when the oval cap is embedded in the hard epoxy to define a cavity having a corresponding shape in the epoxy column in the masonry hole below the end of the shank, the bank of this cavity, portions of which project inwardly into a circle whose diameter is the same as that of the shank, will present a partial barrier to the advance of the shank when the bolt is turned in to tighten the fastening.

Figure 8:
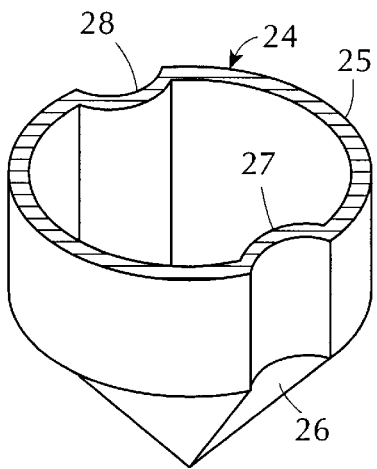
FIG. 8 is another embodiment of the cap included in the assembly.

Another embodiment of a non-cylindrical cap is shown in FIG. 8 in which cap 24 has a shaped side wall section 25 whose lower end is closed by a conical end section 26 and whose upper end is provided with means (not shown) to couple the cap to the end of the shank of the bolt. Side wall section 25 is generally circular in shape and is provided with a diametrically-opposed pair of indentations 27 and 28 which serve to define in the bank of the cavity in the epoxy inward projections.

The internal diameter of the cylindrical portion of side wall section 25 is equal to the diameter of the shank. The internal distance between indentations 27 and 28 is shorter than the diameter of the shank to create in the epoxy the necessary partial barrier to the advance of the shank. In practice, sidewall section 25 may be provided with a second pair of diametrically-opposed indentations on an axis at right angles to the axis of the first pair, thereby providing greater resistance to the advance of the shank.

And in practice, instead of arcuate indentations as illustrated, they may be triangular in form so that the indentations when embedded in epoxy, are more easily cut into and tapped by the advancing shank.

The greater the partial barrier created in the epoxy by the cap, the more difficult it becomes to turn the bolt to overcome the partial barrier and tighten the fastening. But the more difficult it is to tighten the fastening, the stronger is the frictional engagement between the end of the shank and the lined bank of the cavity in the epoxy column, and the greater the resultant resistance to loosing of the bolt.

As a consequence, the preferred shape of the non-cylindrical cap represents a compromise between one which creates a partial barrier that is hard to overcome and one which creates a barrier that is relatively easy to overcome. The ideal cap geometry creates a partial barrier in the epoxy that is not hard to overcome, yet results in good resistance to loosening. But in all cases, the dimensions of the cap must be such that it passes through the mounting hole in the fixture into the drilled masonry hole when the assembly is installed.

While there has been shown preferred embodiments of a chemical anchor bolt and cap assembly in accordance with the invention, it will be appreciated that many changes may be made thereon without departing from the spirit of the invention.

We claim:

1. A chemical anchor bolt and cap assembly installable in a hole drilled in masonry having a charge of a hardenable bonding agent, deposited therein which when hardened acts to produce a fastening to tightly fasten a fixture or other object having a mounting hole to the masonry and to resist loosening of the fastening should the masonry be subjected to external forces; said assembly comprising:

A. a bolt provided with an externally-threaded cylindrical shank extending from a head, said shank having a predetermined diameter and being coated with a release agent; and B. a cap coupled to an end of the shank and extending therefrom said cap having a shape whose geometry is such that at least one internal straight line passing through an axis of the cap is shorter than the diameter of the shank whereby when the shank and the cap coupled thereto are inserted through the fixture mounting hole into the masonry hole and the bonding agent hardens, then a female thread is formed in the bonding agent that matches the thread of the shank to permit the bolt to turn, and a bonding agent column is formed below the end of the shank having a cavity therein defined by the shape of the cap embedded in the column, said cavity having a bonding agent bank lined by the cap which creates a partial barrier to an unimpeded advance of the shank, whereby to tighten the fastening the bolt is turned in to advance the end of the shank to overcome the partial barrier by cutting into the lined bank, the resultant frictional engagement between the end of the shank and the partial barrier resisting turning out of the bolt and loosening of the fastening.

2. An assembly as set forth in claim 1, in which the cap is thin-walled and has a non-cylindrical shape.

3. An assembly as set forth in claim 1, in which the bolt is fabricated of steel.

4. An assembly as set forth in claim 1, in which the externally-threaded shank is coated with a release agent formed of PTFE.

5. An assembly as set forth in claim 1, in which the cap is molded of synthetic plastic material.

6. An assembly as set forth in claim 5, in which the material is polypropylene.

7. An assembly as set forth in claim 1, in which said cap is provided with a coupling ring which engages the end of the shank.

8. An assembly as set forth in claim 1, further including a deformable collar mounted on said shank below the head of the bolt to permit the shank to advance when the bolt is turned to tighten the fastening.

9. An assembly as set forth in claim 8, in which the collar at its upper end is provided with a flange that underlies an underside of said head.

10. An assembly as set forth in claim 1, in which the cap has a polygonal shape formed by angled facets and peaks at the respective junctions of the facets, the dimensions of the cap being such that the internal distance between any pair of opposing peaks is equal to the diameter of the shank and the internal distance between any pair of opposing facets is shorter than the diameter of the shank.

11. An assembly as set forth in claim 10, in which the cap has an octagonal shape defined by eight angled facets and eight peaks at the respective junctions of the facets.

12. An assembly as set forth in claim 1, in which cap has a generally cylindrical shape modified by a pair of diametrically-opposed indentations, the cylindrical portion of the cap having an internal distance between opposing sides of the cap which is equal to the diameter of the shank, the indentations of the cap having an internal distance between opposing sides of the cap which is shorter than said diameter.

13. A chemical anchor bolt and cap assembly installable in a hole drilled in masonry having a charge of a hardenable bonding agent, deposited therein which when hardened acts to create a fastening to tightly fasten a fixture or other object having a mounting hole therein to the masonry and to resist loosening of the fastening should the masonry be subjected to external forces; said assembly comprising:

A. a bolt provided with an externally-threaded cylindrical shank extending from a head, said shank having a predetermined diameter and being coated with a release agent; and B. a cap coupled to an end of the shank and extending therefrom, insertable through the mounting hole in the fixture into the masonry hole containing the hardenable bonding agent whereby when the bonding agent hardens the cap is then embedded in the bonding agent and the bonding agent surrounding the shank has formed therein a thread matching the shank thread to permit the bolt to turn, said cap having a shape creating below the end of the shank a cavity provided with at least one internal surface inwardly disposed with respect to the diameter of the shank to define a partial barrier to an advance of the end of the shank into the cavity when the bolt is turned to tighten the fastening; the advance of the shank causing the shank, as it turns, to cut into the partial barrier to produce a frictional engagement between the end of the shank and the partial barrier that resists a turning out of the shank and a resultant loosening of the fastening.

14. An assembly as set forth in claim 13 in which the cap has a polyhedral shape in which a facet thereof forms said internal surface.

* * * * *